July 5, 1927.
J. KLASNICH
INDICATOR
Filed Sept. 26, 1923
1,635,128
3 Sheets-Sheet 1
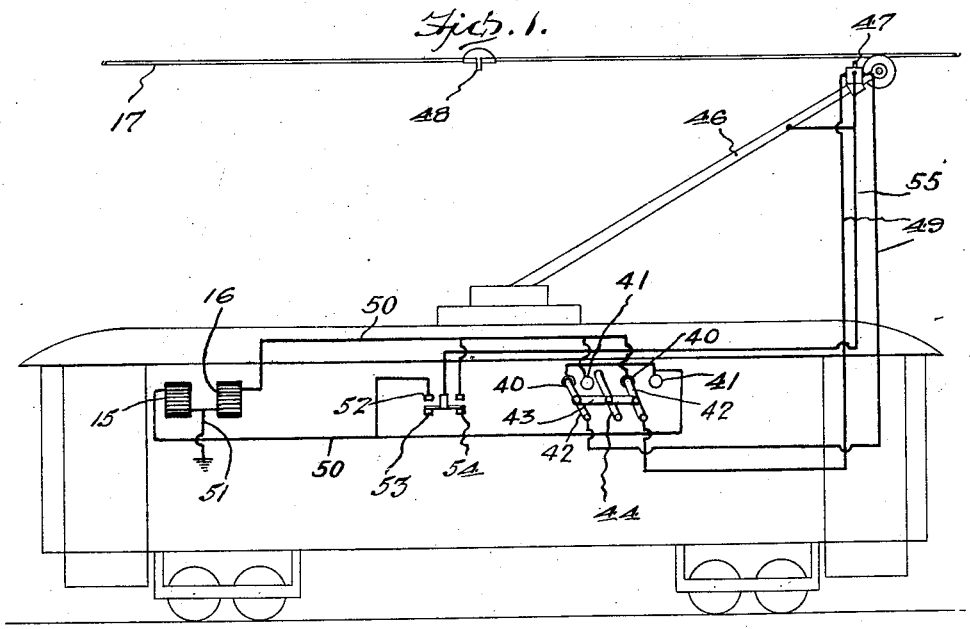
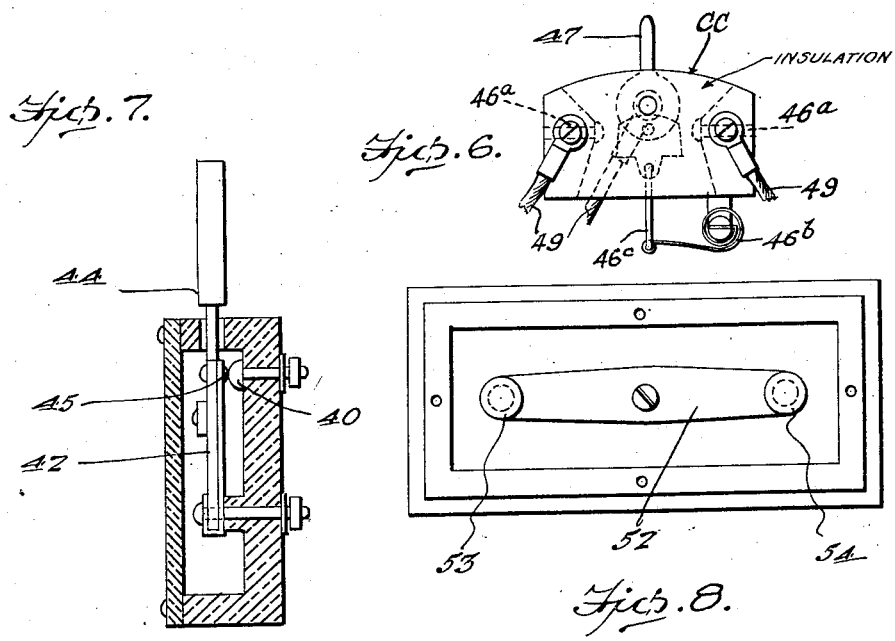
J. Klasnich INVENTOR
BY Victor J. Evans
ATTORNEY
WITNESS:

July 5, 1927.

J. KLASNICH 1,635,128

INDICATOR

Filed Sept. 26, 1923  3 Sheets-Sheet 2

J. Klasnich INVENTOR

BY Victor J. Evans ATTORNEY

WITNESS:

July 5, 1927.
J. KLASNICH
INDICATOR
Filed Sept. 26, 1923
1,635,128
3 Sheets-Sheet 3
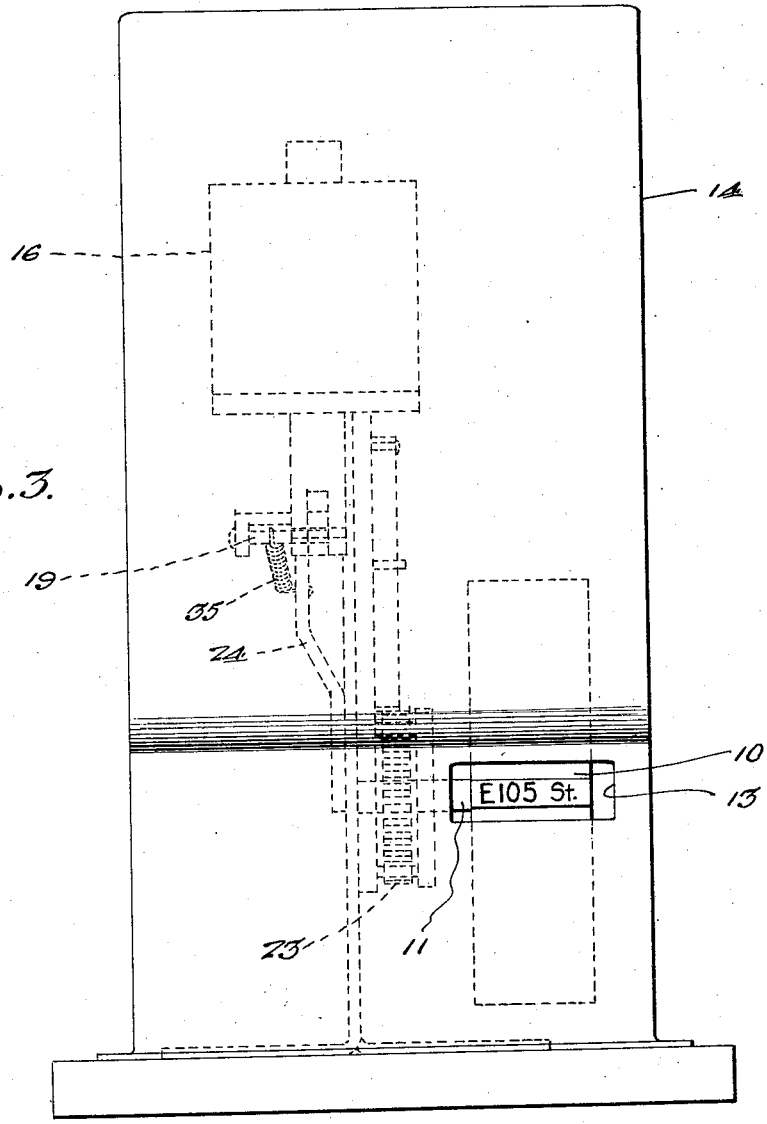
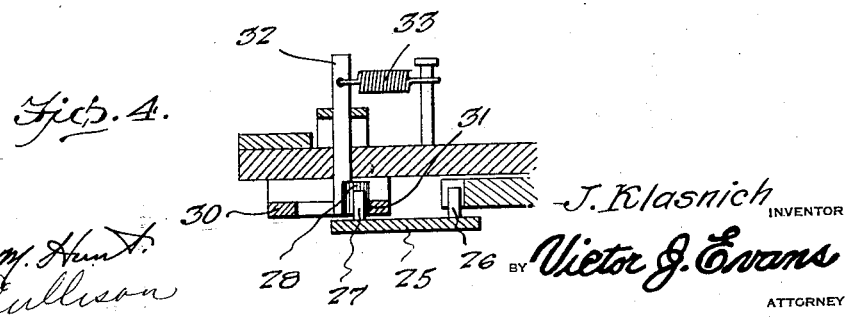

Patented July 5, 1927.

1,635,128

UNITED STATES PATENT OFFICE.

JOHN KLASNICH, OF CLEVELAND, OHIO.

INDICATOR.

Application filed September 26, 1923. Serial No. 664,991.

This invention relates to street car indicators, and contemplates a structure wherein a movable indicator is included in a normally open circuit adapted to be energized from the trolley wire at predetermined intervals, thereby moving said indicator one step or degree to present to view the next station along the route.

In carrying out the invention, I provide a manually operable switch included in said circuit, and adapted to be actuated by the conductor to energize the circuit at any time it is found necessary to adjust the indicator for the purpose of correcting the mistake resulting from false movements of the indicator.

The nature and advantages of the invention will be better understood when the following detailed description is read in connection with the accompanying drawings, the invention residing in the construction, combination and arrangement of parts as claimed.

Figure 1 is a diagrammatic view.

Figure 3 is a view taken at a right angle to Figure 2.

Figure 4 is a detail sectional view showing the pawl and ratchet means for operating the indicator.

Figure 6 is a detail view of the circuit closer carried by the trolley pole.

Figure 7 is a sectional view through the manually operated switch.

Figure 8 is a detail view of the auxiliary switch by means of which either solenoid can be energized independently of the switch shown in Figure 7.

Figure 2:
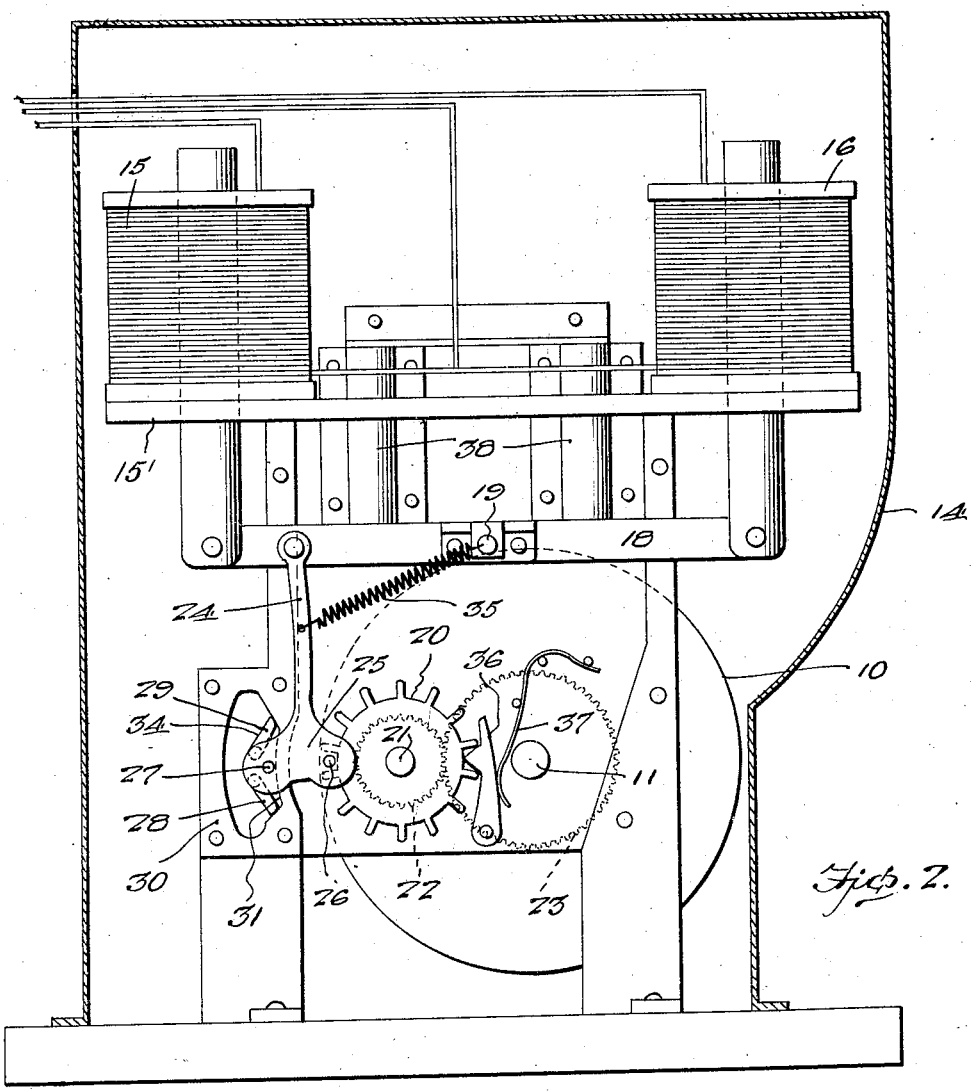
Figure 2 is an enlarged view partly in section showing the actuating means for the indicator.
Figure 5:
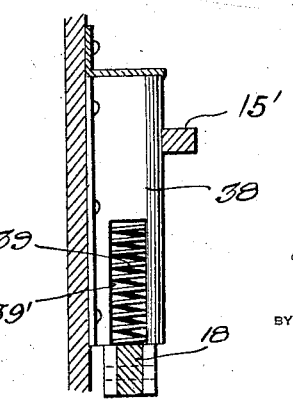
Figure 5 is a sectional view through the means for normally holding the horizontal lever in a normal position, which lever is actuated by one of the solenoids.

Referring to the drawings in detail, 10 indicates the movable indicator above referred to, preferably in the form of a drum mounted upon a shaft 11 for rotation therewith. The names of the various stations along the route are arranged on the periphery of the drum 10 and are equidistantly spaced apart, and adapted to be singly presented to view, through a sight opening 13 provided in a casing 14 in which the indicator operates. The drum will vary in diameter, the size being regulated by the movement of the stations along the particular route. For the purpose of singly presenting the stations to view, the drum is rotated step by step, so that just as soon as the car leaves one station along the route, the drum will be rotated one step or degree to bring into view the next station in order.

The rotation of the drum 10 is controlled by electrically operated means which embodies a pair of solenoids 15 and 16 respectively which are arranged in a normally open circuit adapted to be energized from the trolley wire 17 in a manner to be hereinafter more fully described. These are supported by a bar 15'. The solenoids are connected with the adjacent ends of a lever 18 which is fulcrumed at a point between its ends as at 19, so that this lever is rocked to operate the drum when either of the solenoids is energized. It is of course to be understood that one solenoid is used at a time to rotate the drum in one direction so that the stations along the route will be presented to view in correct order, while the other solenoid is used to reverse the rotation of the drum on the return trip of the car. The lever 18 operates to rotate a toothed wheel 20 carried by a shaft 21 which also has secured thereto a gear 22. This gear meshes with a gear 23 carried by the shaft 11, supporting the drum 10, so that each time the toothed wheel 20 is partially rotated, the drum 10 is simultaneously rotated one step or degree. For rotating the toothed wheel 20 I employ an arm 24 which is pivoted on the lever 18 from which it depends at one side of the toothed wheel 20. The arm is formed with an enlarged end portion 25 which carries a pair of spaced pins 26 and 27 respectively. The pin 26 cooperates with the teeth on the wheel 20 to rotate the latter, while the pin 27 cooperates with a pair of pivot dogs 28 and 29 respectively to force the arm in the direction of the toothed wheel 20 so that the latter is rotated in a proper direction depending upon the particular solenoid energized. In other words, when the solenoid 15 is energized, the lever is moved upon its pivot forcing the arm 24 upwardly during which time the pin 27 cooperates with the dog 29 to hold the pin 26 engaged with the teeth of the wheel 20, and thus positively rotate the wheel in one direction. When the solenoid 16 is energized the lever 18 is again moved upon its pivot, but in this instance, the arm 24 is moved downwardly, during which time the pin 27 cooperates with the other dog 28 to hold the pin 26 operatively associated with the toothed wheel to reverse the rotation of the latter. The pivoted dogs 28 and 29 operate within an opening formed in a guide plate 30, one side of which is curved as at 31, and the pin 27 is arranged to travel over this curved surface so that it is properly guided into the space between the curved surface 31 and the adjacent or confronting faces of the dogs 28 and 29. It will be noted that these dogs carried by the pivot 32, each of which has associated therewith a spring 33 which holds the dogs normally in the position shown in the drawings when the lever 18 is in its true horizontal position. In this position the dogs are reversely inclined, so that after each operation of the lever 18 to rotate the toothed wheel one degree, the pin 27 passes from between the particular dog then in use and the curved surface 31, whereupon the pin travels over the inclined outer surface of the dog indicated at 34, thus moving the pin 26 away from the teeth of the wheel 20 and allowing the lever 18 to return to normal position. After the lever assumes its normal position, a spring 35 exerts a tension on the arm 24 moving the latter in the direction of the wheel 20 so that the pin 26 again engages the teeth thereof. A pivoted pawl 36 is arranged to engage the teeth of the wheel 20 at a point diametrically opposite the normal position of the pin 26, the pawl being retained in operative association with the toothed wheel 20 through the instrumentality of a leaf spring 37. This pawl is used to prevent retrograde movement of the toothed wheel. Arranged above the lever 18 and between the solenoids 15 and 16 respectively, are tubular casing 38, each of which accommodate a coiled spring 39, the latter bearing against the upper edge of the lever 18. When the lever is moved upon its fulcrum, one or the other of the springs 39 is compressed, this of course depending upon which solenoid is energized, the springs 39 functioning to return the lever 18 to normal position after each operation thereof. Each casing 38 is provided with a slot 39' to receive the lever 18 when the latter is rocked upon its pivot.

Included in the circuit with the solenoids 15 and 16 respectively is a manually operable switch adapted to be set by the conductor in charge of the car to put into use one or the other solenoid depending upon the particular direction of travel of the car. This switch includes a plurality of spaced contacts used in pairs, one pair of contacts being indicated at 40 and the other pair at 41. A pair of parallel pivoted members 42 are connected by a transverse strip 43, the latter is in turn connected with a lever 44 so that the parallel members 42 will be moved in unison. These members 42 carry contacts 45 adapted to engage either pair of contacts 40 and 41. When the car leaves the barn, the lever 44 is shifted to bring the contacts into engagement with the contacts 40, so that when the circuit is closed in the manner to be hereinafter described, the solenoid 15 is energized, and consequently the movable indicator is rotated step by step but always in the same direction until the end of the route is reached, so that the stations along the route will be presented to view in their proper order. Before the return trip is started, the lever 44 is reversed so that the contacts 45 will be moved out of engagement with the contacts 40 and into engagement with the contacts 41. Then when the circuit is closed the solenoid 16 is brought into use, whereupon the movable indicator is rotated in an opposite direction step by step until the car reaches the barn. Therefore the stations are again presented to view in their proper order.

For the purpose of energizing the circuit I make use of a circuit closer, shown in Figure 6, carried by the trolley pole 46, it being understood that the circuit is adapted to be energized from the trolley wire 17. This circuit closer includes contacts $46^a$ adapted to be engaged by a movable element 47 which is normally held in neutral position by a spring $46^b$ connected with an arm $46^c$ and which is adapted to be actuated or tripped by stationary elements 48 arranged at proper places along the trolley wire, so that the circuit is closed immediately after the car reaches a particular station, in order that the next station along the route will be presented to view through the sight opening 13 as above described. When the circuit closer is operated, the current passes from the trolley wire 17 through one of the wires 49 connected with the contacts $46^a$ of the circuit closer to the switch hereinabove described. The current flows through this switch and then through one or the other of the wires 50, depending upon the position of the movable contacts 45, or in other words, the particular pair of fixed contacts engaged by these contacts 45. The current passes from one of the wires 50 to one or the other of the solenoids from where it is grounded through the wire 51.

The purpose of this circuit closer structure on the trolley pole and the plurality of contacts therein and wires leading from the contacts is to effect reversal of the operation in case the car is backed along the track without the trolley pole being turned in the usual manner. This feature is of importance in view of the fact that the mechanism is automatically returned to the proper position to correspond to the position of the car when such backing has been effected.

Also included in the circuit is a switch of the push button type, the body of the switch being indicated at 52 and the push buttons indicated at 53 and 54 respectively. This switch is connected with the solenoids 15 and 16 receiving its current from the trolley wire through the wire 55. The purpose of this switch is to make an adjustment of the movable indicator any time it is found necessary in order to set the indicator for the purpose used. In other words, the indicator may fail to operate on a particular occasion, or it may move more than one degree, thus bringing the wrong station to the sight opening 13 of the casing 14. In order to correct this mistake it is only necessary to operate the proper push button 53 or 54 to energize the particular solenoid, and thus rotate the drum 10 in the proper direction to bring the right station before the sight opening. It is of course understood that the solenoids are energized in this manner independently of the circuit closer above referred to.

While it is believed that from the foregoing description, the nature and advantages of the invention will be readily apparent, I desire to have it understood that I do not limit myself to what is herein shown and described and that such changes may be resorted to when desired as fall within the scope of what is claimed.

Having thus described the invention, I claim:

1. A device of the character described including a rotatable drum, a lever pivoted intermediate its ends adjacent the drum, a solenoid supported at each end of the lever, springs bearing against the lever at opposite sides of the pivot point for normally retaining the lever in horizontal position, a toothed wheel supported adjacent the drum, means forming operative connection between the toothed wheel and the drum, means for consecutively energizing either of said solenoids at predetermined times for imparting rocking movement to the lever, means carried by the lever and having operative connection with the toothed wheel whereby to impart movement to the same upon pivotal movement of the pivoted lever in either direction and a spring pressed pawl cooperating with the toothed wheel to normally maintain the same against movement.

2. A device of the character described including a rotatably mounted drum, a lever pivotally mounted intermediate its ends, a solenoid at each end of the lever, means normally maintaining the lever in a horizontal position, a toothed wheel supported adjacent the drum, operative connection between the toothed wheel and drum, an arm depending from said lever upon one side of the pivot, spaced pins carried by the lower end of said arm, one of said pins engaging between the teeth of the toothed wheel, means for consecutively imparting movement to either of said solenoids at predetermined times for imparting movement to the lever and rotating the toothed wheel in either direction in accordance with the solenoid energized and means cooperating with the other pin on the arm during the movement of the lever for moving the pin engaging the toothed wheel from one space to an adjacent space on the toothed wheel during its rotation in either direction and a spring pressed pawl for maintaining the toothed wheel in position after being actuated by the arm.

In testimony whereof I affix my signature.

JOHN KLASNICH.